United States Patent

Suzuki

[19]

[11] Patent Number: 6,134,078

[45] Date of Patent: *Oct. 17, 2000

[54] HIGH SENSITIVITY, LOW DISTORTION YOKE-TYPE MAGNETORESISTIVE HEAD

[75] Inventor: Tetsuhiro Suzuki, Tokyo, Japan

[73] Assignee: NEC Corporation, Tokyo, Japan

[ * ] Notice: Under 35 U.S.C. 154(b), the term of this patent shall be extended for 613 days.

[21] Appl. No.: 08/490,553

[22] Filed: Jun. 15, 1995

[30] Foreign Application Priority Data

Jun. 28, 1994 [JP] Japan ..................................... 6-146345

[51] Int. Cl.$^7$ ..................................................... G11B 5/127
[52] U.S. Cl. ............................................. 360/113; 360/119
[58] Field of Search ..................................... 360/113, 119

[56] References Cited

U.S. PATENT DOCUMENTS

| | | | |
|---|---|---|---|
| 4,954,920 | 9/1990 | Yamada et al. | .......................... 360/113 |
| 5,375,023 | 12/1994 | Ju et al. | .................................. 360/119 |

FOREIGN PATENT DOCUMENTS

| | | |
|---|---|---|
| 58-222403 | 12/1983 | Japan . |
| 61-904 | 1/1986 | Japan . |
| 63-138512 | 6/1988 | Japan . |

OTHER PUBLICATIONS

T. Maruyama et al, "A Yoke Magnetoresistive Head for High Track Density Recording", *IEEE Transaction of Magnetics*, vol. MAG–23, No. 5, Sep. 1987, pp. 2503–2505.

*Primary Examiner*—Sara Crane
*Attorney, Agent, or Firm*—Sughrue, Mion, Zinn, Macpeak & Seas, PLLC

[57] ABSTRACT

In order to obtain a magnetoresistive head which is high in reproducing sensitivity, free from distortion in reproduced waveforms and suitable for high bit density recording, the an MR head includes a magnetic circuit including upper yoke 2 and lower yoke 3 both made of a soft magnetic material and having one ends opposed to each other with gap 1 left therebetween, MR element A 5 magnetically coupled to the other end of upper yoke 2, MR element B 6 magnetically coupled to the other end of lower yoke 3, and back yoke 4 made of a magnetic material for magnetically coupling MR element A 5 and MR element B 6 to each other. Upper yoke 2 and lower yoke 3 are disposed without overlapping each other except at gap 1, and MR element A 5 and MR element B 6 are formed by simultaneous deposition. Due to this construction, the MR head can achieve high bit density recording where the MR elements have a differential structure, since the magnitude of the gap is defined by the film thickness of gap 1 and the MR elements obtained have equivalent characteristics.

4 Claims, 3 Drawing Sheets

HIGH SENSITIVITY, LOW DISTORTION YOKE-TYPE MAGNETORESISTIVE HEAD

BACKGROUND OF THE INVENTION

1. Field of the Invention

This invention relates to a magnetoresistive head for use with magnetic disk devices, magnetic tape devices or like magnetic devices, and more particularly to a yoke type magnetoresistive head.

2. Description of the Prior Art

A magnetoresistive head (hereinafter referred to as MR head) has a high reproducing sensitivity and a reproducing output which does not rely upon the relative speed between the magnetic recording media and the magnetic head. Therefore, the use of a magnetoresistive head is advantageous when attempting to achieve high bit density recording and miniaturization of magnetic recording devices.

Conventional MR heads are divided into two types including a type wherein a magnetoresistive element (hereinafter referred to as MR element) is disposed just above an air bearing surface and directly detects a magnetic flux generated from the magnetic recording media, and the other type wherein an MR element is disposed at a distance from an air bearing surface and detects a magnetic flux generated from the magnetic recording media by way of a magnetic yoke. While the latter type is inferior in reproducing sensitivity to the former type, it is superior in that it is high in reliability since the MR element is not exposed to the air bearing surface.

FIG. 1 is a perspective view showing an example of the general construction of a conventional MR head. The MR head is manufactured by the same process as that of a conventional thin film magnetic head and includes a pair of MR elements A 15 and B 16 magnetically coupled to upper yoke 12 and lower yoke 13, respectively. Gap 11 is defined between upper yoke 12 and lower yoke 13, and information is written onto or read out from magnetic recording media (not shown) by way of gap 11. In the MR head, back yoke 14 is coupled magnetically to MR element A 15 and MR element B 16, and terminals 17 are connected to MR element A 15 and MR element B 16 while intermediate terminal 18 is connected to an intermediate point between MR element A 15 and MR element B 16 in order to assure a high reproducing sensitivity with a differential structure.

FIG. 2 is a perspective view showing another example of a conventional MR head. The MR head includes a pair of MR elements A 25 and B 26. MR element A 25 is magnetically coupled to yoke 22 while MR element B 26 is magnetically coupled to yoke 23, and gap 21 is defined between yokes 22 and 23. In the MR head, back yoke 24 is magnetically coupled to MR element A 25 and MR element B 26, and terminals 27 are connected to MR element A 25 and MR element B 26 while intermediate terminal 28 is connected to an intermediate point between MR element A 25 and MR element B 26 with a differential structure. The track width of the MR head is defined by the thickness of yokes 22 and 23. Further, since MR element A 25 and MR element B 26 of the MR head are formed by simultaneous deposition on the same plane, a differential structure can be obtained readily.

SUMMARY OF THE INVENTION

As described above, conventional MR heads require that a pair of MR elements have the same characteristics in order to obtain a differential output. However, since the MR head shown in FIG. 1 is manufactured by two depositions of MR elements, it is difficult to manufacture an MR head which is free from waveform distortion. Meanwhile, the MR head shown in FIG. 2 is disadvantageous in that it is difficult to produce an MR head for high bit density recording because a gap must be formed using photo-lithography.

According to the present invention, a magnetoresistive head which includes a magnetic circuit including a first magnetic yoke and a second magnetic yoke, each yoke having one ends opposed to the other yoke with a gap left therebetween, a first magnetoresistive element magnetically coupled to the other end of the first magnetic yoke, a second magnetoresistive element magnetically coupled to the other end of the second magnetic yoke, and a third magnetic yoke for magnetically coupling the first magnetoresistive element and second magnetoresistive element to each other, is characterized in that the first and second magnetic yokes are disposed without overlapping each other except for the gap, and the first and second magnetoresistive elements are formed by simultaneous deposition. The magnetoresistive head may comprise a coil formed from a conductor thin film pattern on one or each of two or three of the first, second and third magnetic yokes.

In the magnetoresistive head of the present invention, since the magnetoresistive films (hereinafter referred to as MR films) are formed by simultaneous deposition, a differential structure can be obtained readily, and where a differential structure is employed, the MR head has a high reproducing sensitivity, and a reproducing waveform free from distortion can be obtained from the MR head. Further, since the gap depends upon the thickness of a gap layer similar to conventional MR heads, a head suitable for high bit density recording can be produced.

DETAILED DESCRIPTION OF THE PREFERRED EMBODIMENTS

The present invention is described below with reference to the drawings.

Figure 1:
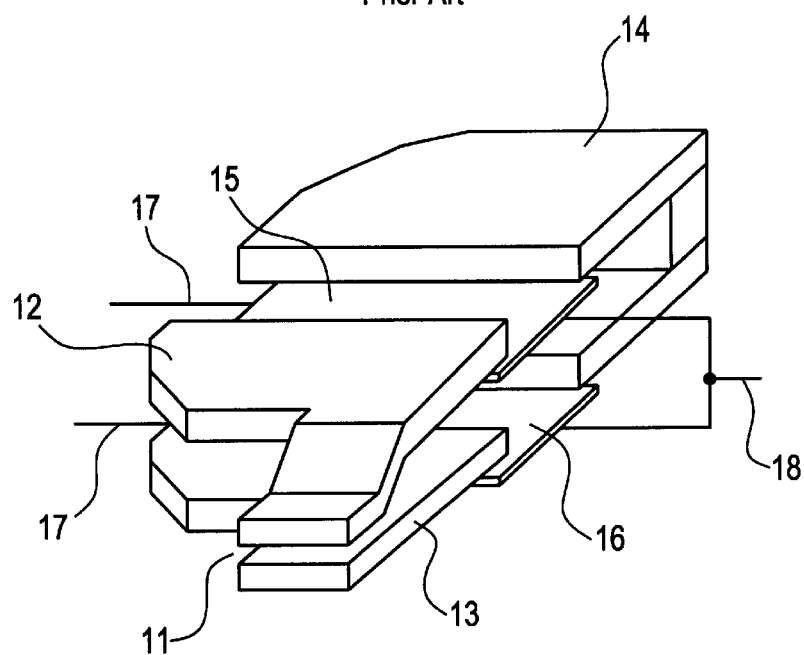
FIG. 1 is a perspective view showing a general construction of a conventional example.
Figure 2:
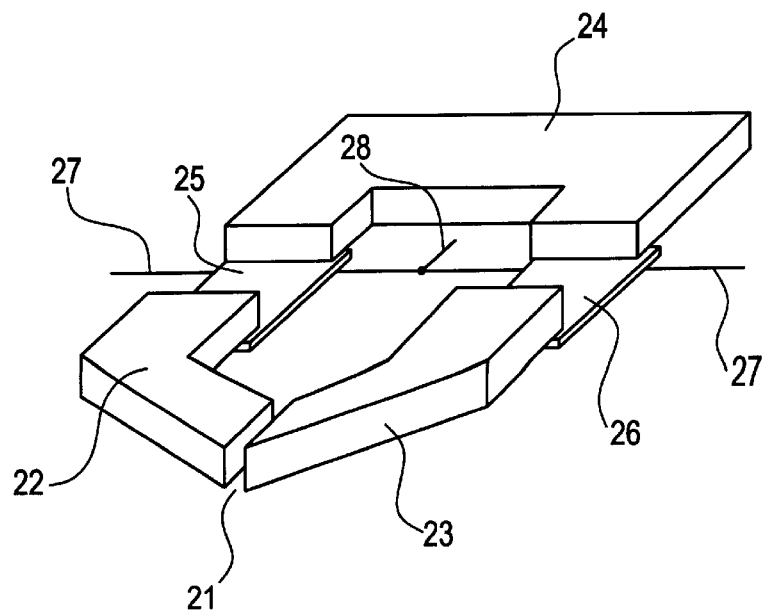
FIG. 2 is a perspective view showing a general construction of another conventional example.
Figure 3:
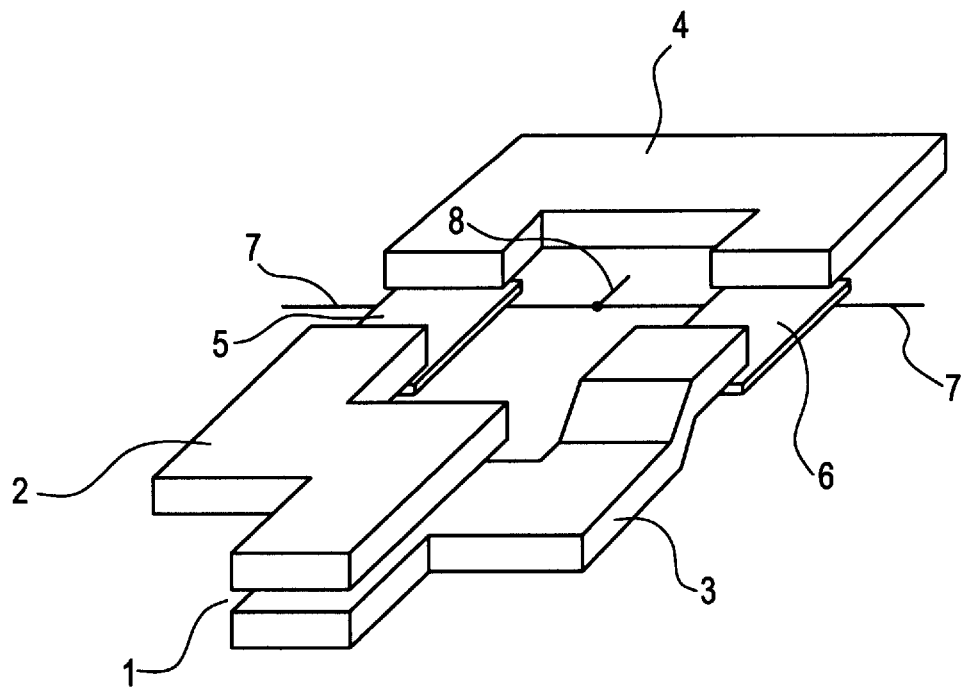
FIG. 3 is a perspective view showing a general construction of a first embodiment.

FIG. 3 is a perspective view showing a general construction of a first embodiment. The MR head of the first embodiment includes, as shown in FIG. 3, a magnetic circuit including upper yoke 2 and lower yoke 3 both made of a magnetic material and each yoke having one end opposed to the other yoke with gap 1 left therebetween, MR element A 5 magnetically coupled to the other end of upper yoke 2, MR element B 6 magnetically coupled to the other end of lower yoke 3, and back yoke 4 made of a magnetic material for magnetically coupling MR element A 5 and MR element B 6 to each other. Upper yoke 2 and lower yoke 3 are disposed without overlapping with each other except gap 1, and MR element A 5 and MR element B 6 are formed by simultaneous deposition.

A method of manufacturing the MR head of the first embodiment is described below.

First, $SiO_2$ is deposited as a film of having a film thickness of about 10 μm on an $Al_2O_3$-TiC (alumina-titanium carbide) substrate (not shown) by a sputtering method. Then, an MR film including a NiFe alloy film having a film thickness of 30 nm, a Ta film having a film thickness of 20 nm and a CoZrMo film having a film thickness of 40 nm is deposited by a sputtering method. Thereafter, the MR film is patterned by an ion milling method to produce MR element A 5 and MR element B 6. Further, terminals 7 constituted from conductive thin film patterns for connecting MR element A 5 and MR element B 6 to a circuit system are formed. Terminals 7 are formed from an Au film having a film thickness of 300 nm. Furthermore, intermediate terminal 8 made of an Au film is connected as a conductive thin film pattern for electrically connecting MR element A 5 and MR element B 6 to each other.

Then, a $SiO_2$ film having a film thickness of 10 nm is deposited on the entire area of the substrate by a sputtering method so as to provide a gap (not shown) between the MR elements and yokes which will be deposited subsequently and constitute a magnetic circuit. Further, a CoZr film having a film thickness of 2 μm is deposited by a sputtering method, and the CoZr film is patterned by an ion milling method so that lower yoke 3 and back yoke 4 may be formed.

Thereafter, a $SiO_2$ film having a film thickness of 10 nm which serves as gap 1 for writing or reading information onto or from a magnetic recording media is deposited by a lifting off method at a location where upper yoke 2 and lower yoke 3 overlap with each other. Then, a CoZr film having a film thickness of 2 μm is deposited by a sputtering method, and upper yoke 2 is formed by an ion milling method similarly to lower yoke 3.

In the MR head of the present invention manufactured in the manner described above, since the gap thickness can readily be made thin by changing the deposition conditions, high bit density recording is realized. Further, since the MR head of the present invention employs a reproducing system based on a differential structure for the equivalent MR elements formed by simultaneous deposition, it does not produce distortion in reproduced waveform and a high reproducing output can be obtained.

Figure 4:
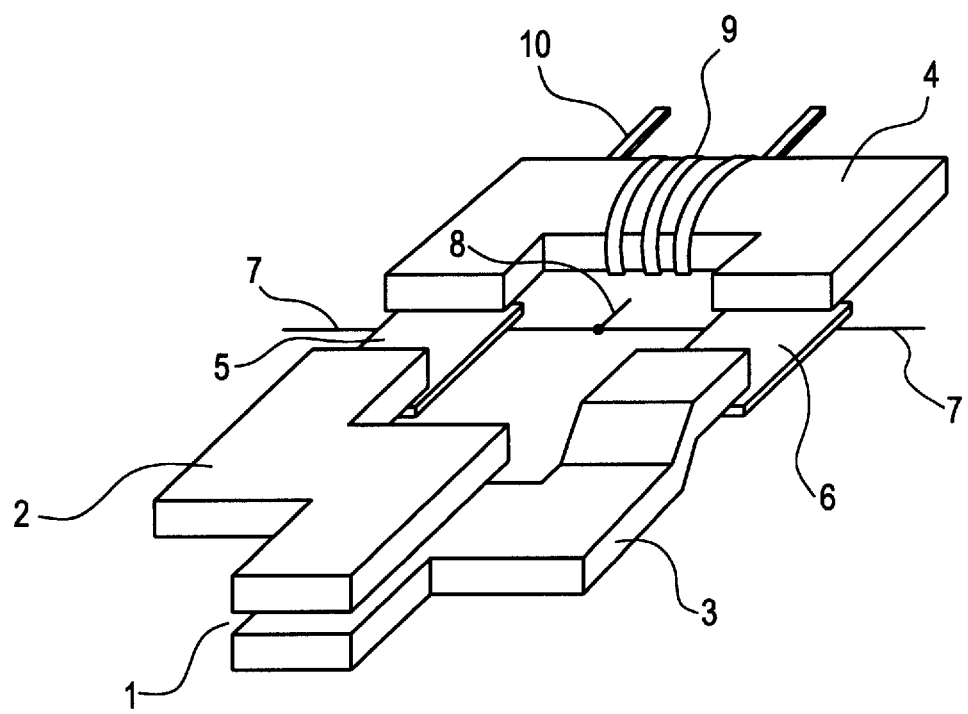
FIG. 4 is a perspective view showing a general construction of a second embodiment.

FIG. 4 is a perspective view showing a general construction of a second embodiment. The MR head of the second embodiment is manufactured in the following manner. First, as shown in FIG. 4, $SiO_2$ is deposited as a film having a film thickness of about 10 μm on an $Al_2O_3$-TiC substrate (not shown) by a sputtering method, and then, MR element A 5, MR element B 6, terminal 7, intermediate terminal 8, and gap 1 provided between MR element A 5, MR element B 6 and upper yoke 2, lower yoke 3 are formed in a similar manner as that of the first embodiment shown in FIG. 3. Then, a lower coil (not shown) formed from a plated Cu film of the film thickness of 1 μm is formed by a plating method.

Further, lower yoke 3, back yoke 4, gap 1 and upper yoke 2 are formed in a similar manner as the first embodiment shown in FIG. 3. Thereafter, upper coil 9 made of a plated Cu film of the film thickness of 1 μm is formed by a plating method so that the electric continuity to the lower coil is not damaged by an insulator layer, and simultaneously, coil terminals 10 are connected to upper coil 9.

The MR head of the second embodiment manufactured in a manner described above has, in addition to the advantages of the first embodiment described above, a function that information can be recorded onto a magnetic recording media by the coil formed on back yoke 4.

Figure 5:
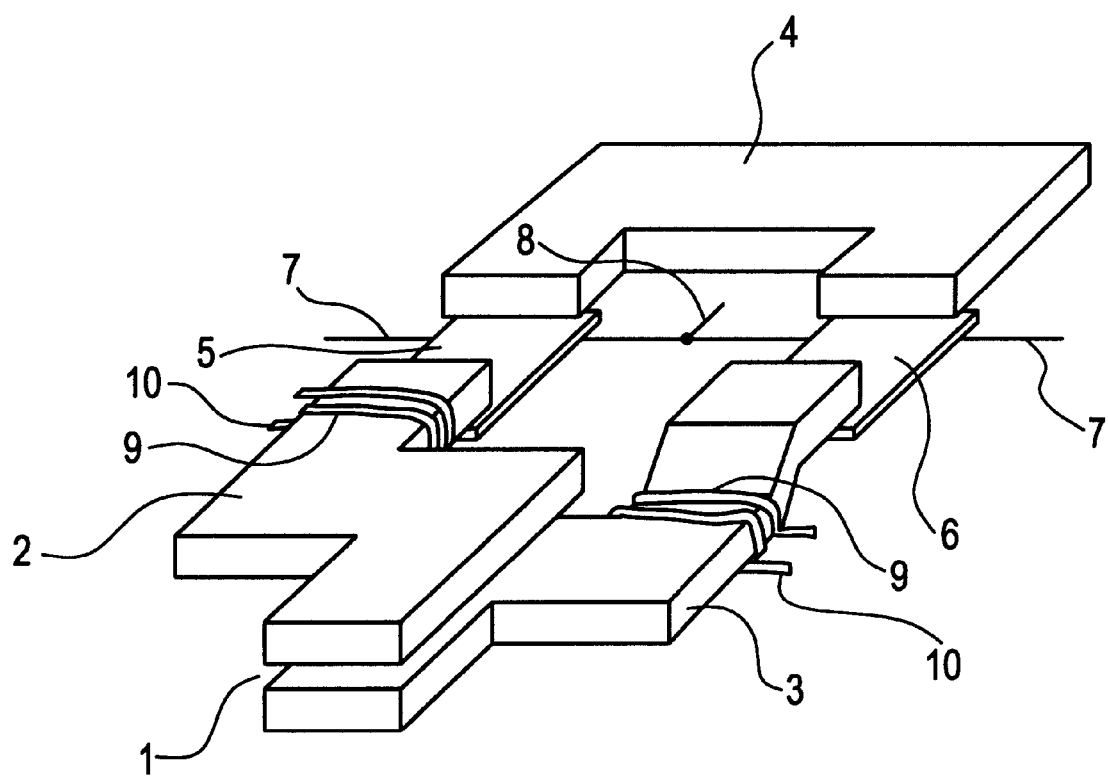
FIG. 5 is a perspective view showing a general construction of a modification to the embodiment of FIG. 4.

It is to be noted that, while the second embodiment is an example wherein a coil is provided on a back yoke as shown in FIG. 4, the coil may be provided on one, two (refer to FIG. 5) or all of upper yoke 2, lower yoke 3 and back yoke 4. In any case, similar advantages can be achieved.

As described above, according to an MR head of the present invention, since the magnitude of the distance of the gap is defined by the film thickness of the gap, high bit density recording is easy. Further, since a reproducing system which has a differential structure is employed with equivalent MR elements formed by simultaneous deposition, the MR head is advantageous because a reproduced waveform free from distortion and a high reproducing output can be obtained.

The MR head of the present invention is also advantageous because, since each of the MR elements is not exposed to the air bearing surface, the production of noise in the MR elements when the MR elements contact with and slidably move on a magnetic recording media is suppressed.

What is claimed is:

1. A magnetoresistive head which includes a magnetic circuit including a first magnetic yoke and a second magnetic yoke, each yoke having one end opposed to one end of the other yoke with a gap left therebetween, a first magnetoresistive element magnetically coupled to the other end of said first magnetic yoke, a second magnetoresistive element magnetically coupled to the other end of said second magnetic yoke, and a third magnetic yoke for magnetically coupling said first magnetoresistive element and second magnetoresistive element to each other, wherein said first and second magnetic yokes are disposed without overlapping each other except at said gap, and said first and second magnetoresistive elements are formed by simultaneous disposition.

2. A magnetoresistive head as claimed in claim 1, further comprising a coil formed from a conductor thin film pattern on said third magnetic yoke.

3. A magnetoresistive head as claimed in claim 1, further comprising a coil formed from a conductor thin film pattern on each of said first and second magnetic yokes.

4. A magnetoresistive head as claimed in claim 1, comprising a coil formed from a conductor thin film pattern on each of said first, second and third magnetic yokes.

* * * * *